(12) United States Patent
Pfandl et al.

(10) Patent No.: US 10,160,041 B2
(45) Date of Patent: Dec. 25, 2018

(54) DEVICE CONFIGURED TO SELECTIVELY APPLY TOOLS AGAINST A WORKPIECE ON A LATHE

(71) Applicants: Erich Pfandl, Zeltweg (AT); Egon Werner Kern, Rothenthurm (AT)

(72) Inventors: Erich Pfandl, Zeltweg (AT); Egon Werner Kern, Rothenthurm (AT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/285,612

(22) Filed: Oct. 5, 2016

(65) Prior Publication Data

US 2018/0093333 A1    Apr. 5, 2018

(51) Int. Cl.
*B23B 29/24* (2006.01)
*B23B 29/26* (2006.01)

(52) U.S. Cl.
CPC ............ *B23B 29/248* (2013.01); *B23B 29/26* (2013.01); *B23B 2270/025* (2013.01); *B23B 2270/027* (2013.01)

(58) Field of Classification Search
CPC ............... B23B 29/248; Y10T 82/2585; Y10T 82/2587; Y10T 82/2589; Y10T 82/2591; Y10T 407/2204; Y10T 407/2202; Y10T 407/2208; Y10T 407/221; Y10T 407/2214; Y10T 407/2218
USPC .................................. 269/27, 32, 58; 483/17
See application file for complete search history.

(56) References Cited

U.S. PATENT DOCUMENTS

| 132,573 | A | * | 10/1872 | Hadley | ................... B23B 29/04 82/158 |
| 941,543 | A | * | 11/1909 | Sistek et al. | ............ B25B 5/122 269/157 |
| 1,626,953 | A | * | 5/1927 | Muller | .................. B23B 29/248 82/158 |
| 2,257,029 | A | * | 9/1941 | Zimmermann | ....... B23B 29/248 470/80 |
| 2,608,879 | A | * | 9/1952 | Mancia | ..................... B23Q 5/40 74/405 |

(Continued)

FOREIGN PATENT DOCUMENTS

| DE | 952485 C | * | 11/1956 | ........... B23B 29/248 |
| DE | 1017436 B | * | 10/1957 | ........... B23B 29/248 |

(Continued)

*Primary Examiner* — Ryan Rufo
(74) *Attorney, Agent, or Firm* — Bryan Peckjian; SKF USA Inc. Patent Dept.

(57) ABSTRACT

A device for selectively moving a first or second tool relative to a workpiece on a lathe, the device including a first and a second tool providing system, each of the tool providing systems including a guide rail having a length direction, a slide slidably mounted on the guide rail, the slide being shiftable from a waiting position to a work position, a tool retainer on the slide, a block fixed relative to the guide rail, a first lever pivotably mounted to the block, a second lever having a first end pivotably mounted to the block and a second end pivotably mounted to the slide, and a linear actuator having a rod pivotably connected to the first lever, the rod extending in a direction not parallel to the length direction of the guide rail and being shiftable from a first position to a second position.

16 Claims, 4 Drawing Sheets

(56) References Cited

U.S. PATENT DOCUMENTS

| | | | | |
|---|---|---|---|---|
| 2,627,107 A * | 2/1953 | Malco | ............... | B23B 29/04 407/1 |
| 2,954,570 A * | 10/1960 | Couch | ............... | B23B 29/248 407/11 |
| 3,361,018 A * | 1/1968 | Druckman | ............... | B23Q 1/36 82/137 |
| 3,387,516 A * | 6/1968 | Martin | ............... | B23B 29/04 82/138 |
| 3,580,118 A * | 5/1971 | Hazel | ............... | B23B 5/14 82/100 |
| 3,813,970 A * | 6/1974 | Mitchell | ............... | B23B 29/26 82/112 |
| 4,100,826 A * | 7/1978 | Takahashi | ............... | B23B 29/248 82/118 |
| 4,292,865 A * | 10/1981 | Liu | ............... | B23B 27/1674 407/83 |
| 4,417,489 A * | 11/1983 | Liu | ............... | B23B 1/00 82/1.11 |
| 5,392,502 A * | 2/1995 | Freer | ............... | G05B 19/425 29/52 |
| 6,636,777 B1 * | 10/2003 | Kokubo | ............... | B23B 3/162 700/192 |
| 2013/0104708 A1 * | 5/2013 | Ho | ............... | B23B 29/12 82/161 |

FOREIGN PATENT DOCUMENTS

| | | | | |
|---|---|---|---|---|
| DE | 7623660 U1 | 12/1976 | | |
| DE | 3216892 A1 | 11/1983 | | |
| DE | 102009004964 A1 | 8/2009 | | |
| EP | 0882548 A2 | 12/1998 | | |
| EP | 1661650 A1 * | 5/2006 | ............ | B23B 3/162 |
| FR | 638418 A * | 5/1928 | ............ | B23B 29/248 |
| GB | 1119809 A * | 7/1968 | ............ | B23B 29/248 |
| GB | 2166678 A | 5/1986 | | |
| WO | 2005080048 A1 | 9/2005 | | |

* cited by examiner

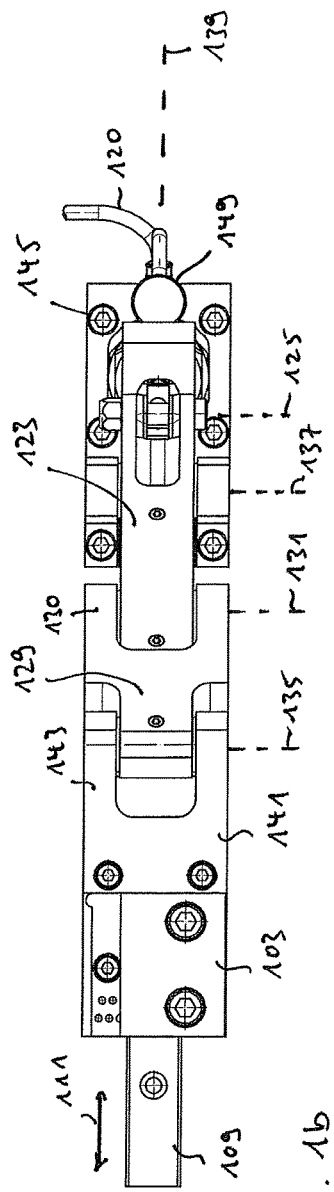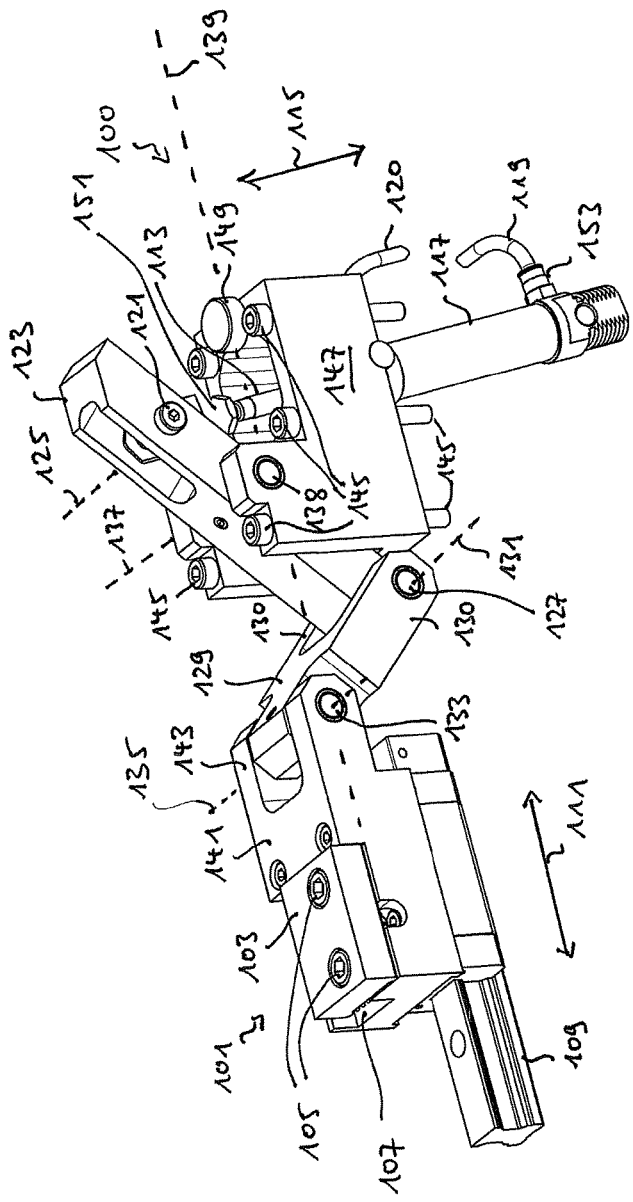

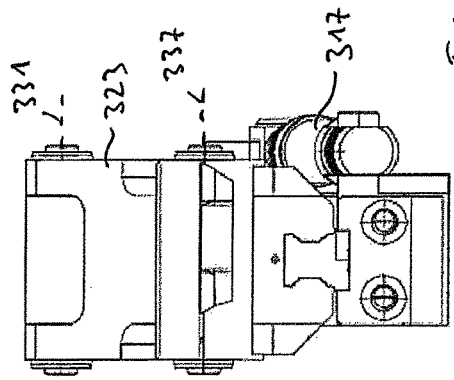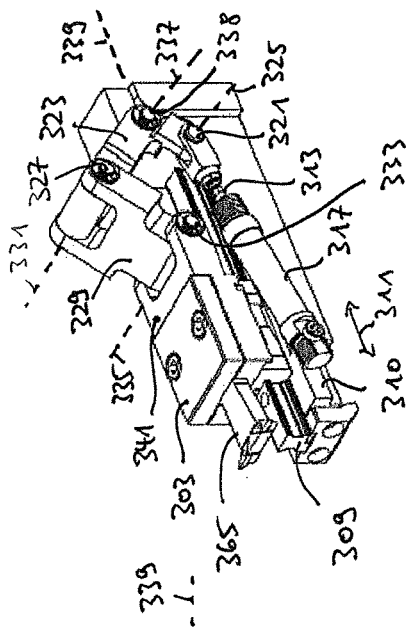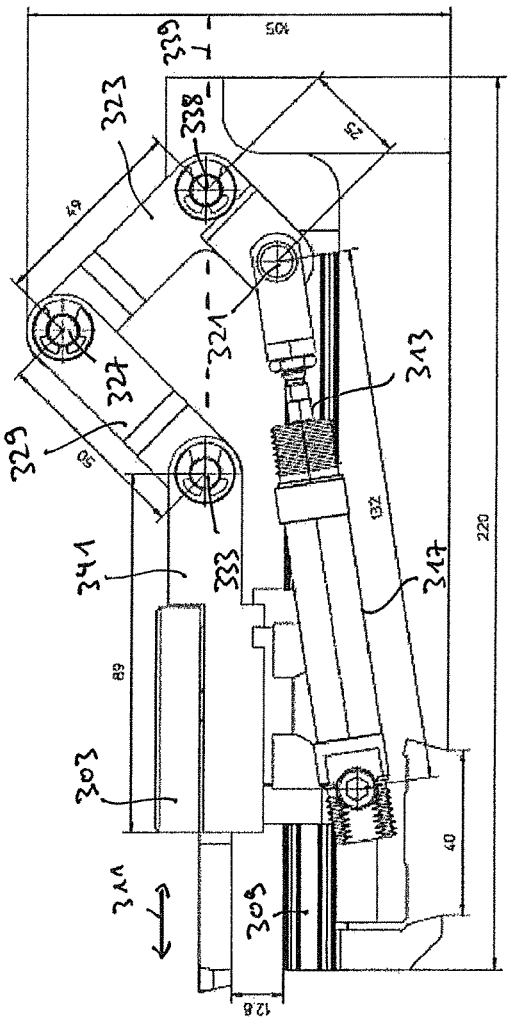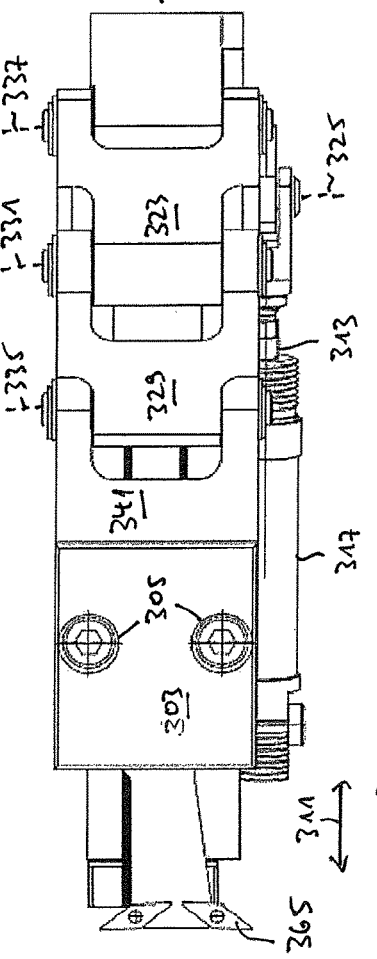

DEVICE CONFIGURED TO SELECTIVELY APPLY TOOLS AGAINST A WORKPIECE ON A LATHE

TECHNOLOGICAL FIELD

The present disclosure is directed to a system for moving tools between a storage and a working position relative to a workpiece mounted on a lathe so that the tools can individually by applied against the workpiece.

BACKGROUND

A lathe can be used for manufacturing mostly rotationally symmetric workpieces by the turning or also by cutting and/or milling. With a lathe and appropriate tools attached thereto, workpieces in the form of different bodies of rotation can be produced. For example, using a lathe and an appropriately selected processing tool, plastic seals can be produced from semi-finished products, in particular from thick-walled plastic tubes. Here the seals, for example, can be cut out or cut off or turned out from the plastic tubes. For turning a product or a plurality of products a variety of processing tools, for example, for cutting, milling, or tapping can be required depending on the desired end product, and each of these processing tools must be moved into a proper position for processing the rotating semi-finished product. A cutting tool, for example, can be pressed against the semi-finished product and can carry out a cutting operation as the semi-finished product rotates. During the rotation of the semi-finished product the cutting tool (or any other tool) can be shifted relative to the semi-finished product in order to achieve a desired profiling or processing.

When using a CNC lathe it can be necessary to exchange one of a plurality of turning tools for another in order to realize desired turning contours. In order to achieve a high processing throughput this tool exchange should occur as quickly as possible. In conventional CNC systems a tool revolver may be used for the exchange operation, and the turning tools are fixed on a disc on the tool revolver. In order to select a desired tool for processing, the disc is rotated about an axis, using a motor, for example, until the desired selected cutting tool is in an appropriate work position. A so-called linear slide has also bee used in the prior art as a further possibility for a rapid turning tool exchange, wherein the turning tools are fixedly disposed with respect to one another. To use a selected tool it is moved toward the tool with the help of the coordinate table of the lathe. A disadvantage of this linear slide is that it is only suited for small turning diameters, because in order to prevent collisions the turning diameter must be allowed for as distance from one tool to the other as safety spacing for collisions.

Both in systems using a tool revolver and systems using a linear slide the free area for processing is limited by the geometry of the tools or by their arrangement. Thus in conventional systems only a certain number, i.e., limited number, of tools can be used and there is nonetheless always a risk of collision.

SUMMARY

It is an aspect of the present disclosure to provide a tool exchange system and method for a lathe, which allows for the exchange a variety of cutting or processing tools, reduces a risk of collision, and can be carried out in a reliable and secure manner.

According to one embodiment of the present disclosure, a device for selectively providing a first or at least one second tool (or a plurality of further tools) for a lathe (in particular a CNC lathe) is provided, wherein the device includes a first and at least one second tool providing system (or a plurality of tool providing systems). Here each tool providing system includes a retaining element (in particular a clamping element), which is configured to hold (in particular to clamp, to fix, so that with rotation of the workpiece the respective tool maintains its position) the respective tool (turning tool or cutting tool or milling tool) for processing a workpiece (e.g., a semi-finished product such as, for example, a thick-walled plastic tube) by the lathe. Furthermore, the device includes a rod which is mechanically connected to the retaining element (in particular via a plurality of levers, which are pivotably connected), in order to selectively shift (which can in particular comprise a pure translation, wherein, however, a partial rotational movement is also possible) the respective held tool into a work position (wherein the respective tool carries out a processing of the workpiece) or a waiting position (wherein the respective tool is removed or is retracted from the workpiece so that no processing of the workpiece occurs) with driven rod (so that it moves, in particular in a longitudinal direction).

The respective tools can, for example, be attached or be attachable to the retaining element by adhering and/or screwing. The device can, for example, comprise two to ten tool providing systems so that a selective processing of a workpiece or a plurality of workpieces with, for example, between two and ten different turning tools is made possible by the device. The rod can (via one or more mechanical intermediate elements) translate the retaining element linearly, i.e., in a straight line, in order to introduce the respective tool to the workpiece or move it away from the workpiece.

For processing the workpiece exactly one of the tool providing systems can be in a work position operating mode, while all the other tool providing systems can be in a waiting position operating mode. In the waiting position operating mode the tools attached to or retained on these other tool providing systems are retracted from the workpiece so that collisions are reduced. Furthermore, the free space for the processing is thereby less limited by the geometry of the tools or their arrangement. A greater number of tools can thereby also be used than in conventional systems.

According to embodiments of the present disclosure the turning tools can be movably mounted on the coordinate table of the lathe one-over-another (or adjacent to one another) without spacing and can be moved back and forth with the help of a lever system and, for example, an air cylinder. As a result only the moved or the required or the selected tool can be moved forward, while all the others are located at a distance from the workpiece, i.e., located behind or retracted relative to the workpiece and the working tool. Thus no collisions can occur. A further advantage of embodiments of the disclosure can be a space savings and the possibility of being able to place significantly more tools on a smaller space than was possible conventionally.

According to one embodiment of the disclosure, the device further comprises a cylinder with piston and piston rod, the rod being formed as the piston rod of the piston, which can be moved back and forth in the cylinder pneumatically or hydraulically. The cylinder can, for example, include one (or two) compressed air terminals in order to supply compressed air to the cylinder, in order to thus move the piston and the piston rod along a longitudinal direction of the cylinder and thus also a longitudinal direction of the piston rod. A compressor can further be provided for providing the compressed air to the respective cylinders of the tool providing systems, as well as a compressed air distribution system with compressed air hoses. Furthermore, valves can be provided in the compressed air hoses, which valves can be controlled by a user in order to drive a piston rod of a selected tool providing system. The device can thereby be realized for selectively providing different tools to a lathe.

According to one embodiment of the present disclosure the device further comprises a first joint (rotational joint, which makes possible a pivoting or rotating about an axis), a first lever, a second joint, a second lever, and a third joint, wherein the first joint pivotably (rotatably about an axis) connects the rod to the first lever, wherein the second joint pivotably (rotatably about an axis) connects the first lever to the second lever, and wherein the third joint pivotably (rotatably about an axis) connects the second lever to the retaining element. Thus an advantageous joint lever chain can be formed, which can make possible a linear shifting of the retaining element with operation of the rod, without, for example, subjecting the rod in the working position to an increased force in the longitudinal direction. The joint lever chain can, for example, be configured and connected to the rod such that a force, which acts along the shifting direction of the retaining element in the work position (e.g., due to the contact with the workpiece) extends transverse, in particular perpendicular, to a longitudinal direction of the rod. Thus in an advantageous manner the rod can only be subjected to a low load along its longitudinal direction while the tool providing system is in the work position operating mode. Thus no particular performance requirements are placed on the air cylinder or hydraulic cylinder, so that the device can be realized with cost effective and space saving components.

Furthermore, the device can include a torsion resistant guide rail, along which the retaining element is shiftable and which in particular is fixed perpendicular to the shifting direction. Thus an exactly defined shifting can be achieved and the position of the extended tool can be maintained during operation.

The first lever can be rotatable about a lever pivot axis, which can in particular be fixed relative to the guide rail. Thus a load minimizing design of the lever-joint system can be realized.

In the work position (in the work position operating mode of the respective tool providing system) parallel axes of rotation of the second joint, of the third joint, and the lever pivot axes parallel thereto (and in particular also the axis of rotation of the first joint) can be disposed such that a straight line can be drawn through them and perpendicular to them, the line extending in the shifting direction. A force acting along the shifting direction (in the work position) can thus act on the (fixed) lever pivot axis without directly acting on the rod. Thus a mechanical loading of the rod or of the cylinder driving it or of the piston driving it can be reduced.

In the work position a longitudinal direction of the rod can extend perpendicular to the straight line extending along the shifting direction. Thus a loading of the rod can be advantageously minimized.

The device can further include a table movable transverse, in particular perpendicular, to the shifting direction of the retaining element, on which table the first and the second (and possibly a plurality of further) tool providing systems are mounted adjacent to each other. It is thus made possible to introduce a selected rotary machining tool (which is retained by a certain tool providing system) onto or against the workpiece for processing. Furthermore, for this purpose conventionally available movable tables can be used, which can reduce the costs of the device.

The retaining element can be shifted in a straight line from the work position to the waiting position by a distance between 20 mm and 50 mm, in particular between 30 mm and 40 mm. Thus a plurality of different rotary machining tools can be brought selectively by the device into the respective work position for processing a workpiece. Furthermore, a majority of conventionally available turning tools can thereby be supported.

The device can further include a controller (e.g., a microprocessor or microcontroller or programmable logic controller), which is configured to bring the first tool of the first tool providing system into the waiting position, to move the table transverse to the shifting direction of the retaining element of the first tool providing system, and to bring the second tool of the second tool providing system into the work position. Thus a shifting of the tool can be carried out in a coordinated manner on the one hand by shifting the retaining element and on the other hand by shifting the table in order to reduce or prevent collisions. For controlling, for example, an electronic controller with programming capability can be used, and a suitable control program can be loaded in a processor and executed.

The individual turning tools can be mounted on torsion resistant guide rails. The connection to the air cylinder can be effected by two levers and three joints. The mechanism can be driven by a hydraulic or a pneumatic cylinder. The mechanism can be designed such that the tool is locked in the extended state by the levers and joints. The individual tools can be disposed adjacent to one another, each on its own rail. In the retracted state (waiting position) the turning tool can be located removed from the workpiece, and in the extended state (work position) the turning tool can be introduced onto or against the workpiece and ready for turning (or for rotary machining). According to embodiments of the disclosure a cost-effective possibility of the tool exchange can be realized. Here the advantage of the freedom from collisions of a tool revolver can be combined with a simple design of a linear slide.

Exemplary embodiments of the present disclosure are now explained with reference to the accompanying drawings. The invention is not limited to the illustrated or described embodiments.

BRIEF DESCRIPTION OF THE DRAWINGS

FIG. 1a is a front elevational view of a tool providing system for selectively providing different tools for a lathe according to an embodiment of the present disclosure.

FIG. 1b is top plan view of the tool providing system of FIG. 1a.

FIG. 1c is left side elevational view of the tool providing system of FIG. 1a.

FIG. 1d is a perspective view of the tool providing system of FIG. 1a.

FIG. 3a is a front elevational view of a tool providing system for selectively providing different tools for a lathe according to another embodiment of the present disclosure.

FIG. 3b is top plan view of the tool providing system of FIG. 3a.

FIG. 3c is left side elevational view of the tool providing system of FIG. 3a.

FIG. 3d is a perspective view of the tool providing system of FIG. 3a.

DETAILED DESCRIPTION

Figures 1A, 1C:
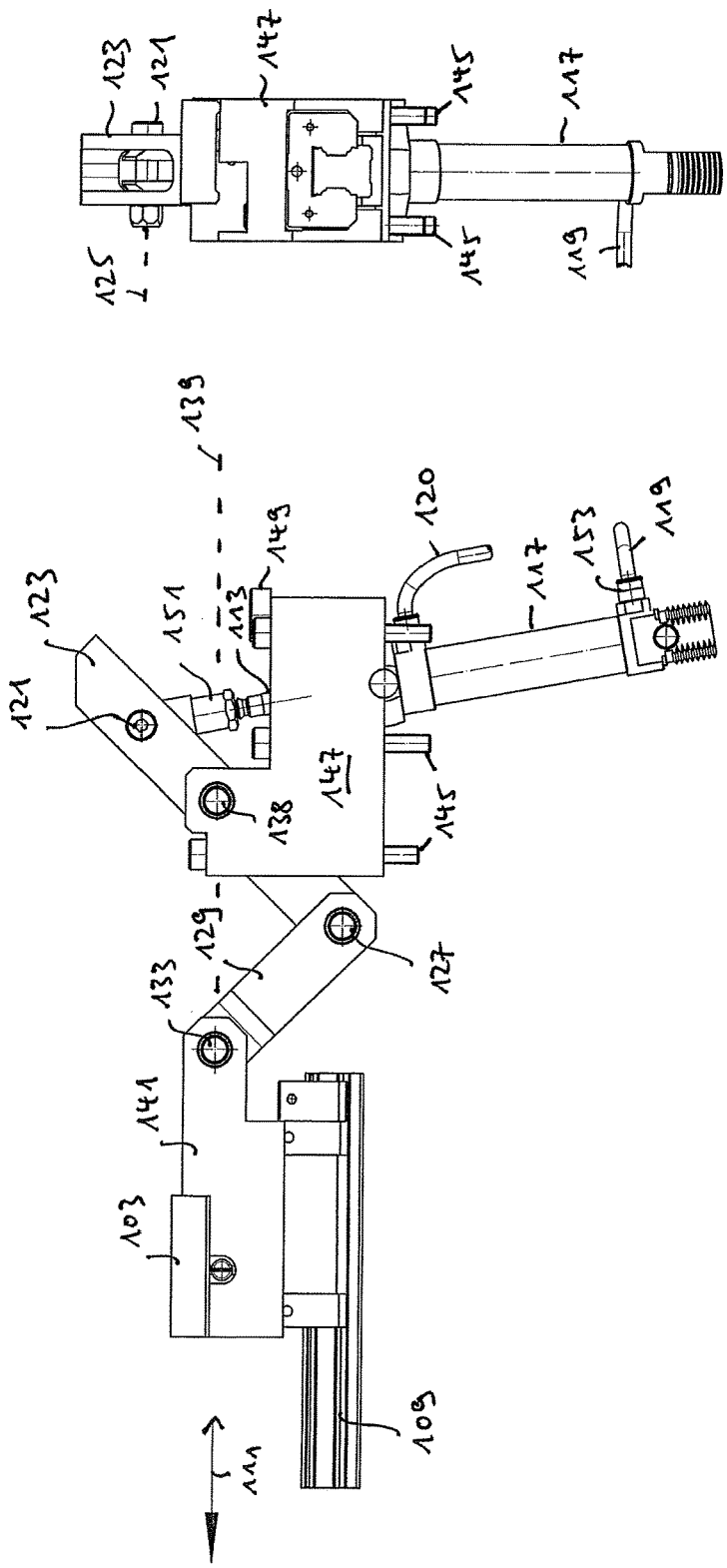

FIG. 1d illustrates in schematic perspective view a tool providing system 100, which can be used in a device for selectively providing various tools for a lathe. The tool providing system 100 comprises a retaining element 101, which is configured to hold a respective tool for processing a workpiece on the lathe. The retaining element 101 is configured as a clamping element with a clamping plate 103 and clamping screws 105, using which a tool, not depicted in FIGS. 1a to 1d, can be held in a receiving space 107 by clamping or pressing by tightening the clamping screws 105. The receiving space 107 can be formed in a standard size and shape to accommodate commercially available turning tools.

The retaining element 101 is shiftable on a guide rail 109 along a shifting direction 111, by a shifting distance of, for example, between 20 mm and 50 mm. The guide rail 109 can be fixedly mounted on a movable table so that the retaining element 101, when it is mounted on the guide rail 109, cannot be shifted perpendicular to the shifting direction 111. This is true in particular when a tool held in the retaining element 101 is located in a work position for processing a workpiece.

The tool providing system 100 further comprises a piston rod 113, which is mechanically connected to the retaining element 101 via a series of levers and joints in order to selectively shift a respectively held tool into a work position or into a waiting position when the piston rod 113 is driven. The operating state illustrated in FIGS. 1a to 1d is a state for holding a tool in a waiting position with the retaining element 101 located in a retracted position. In order to shift a tool into a work position, the piston rod 113 can be shifted along a longitudinal direction 115 by a piston (not depicted in the Figures), which is moved inside a compressed air cylinder 117 by compressed air, which is supplied via a compressed air hose 119 or 120.

The tool providing system 100 further includes a first joint 121 which is attached to an upper end of the rod 113. A first lever 123 is pivotable via the joint 121 about a joint axis 125. The system 100 further includes a second joint 127, using which a second lever 129 is pivotable about a pivot axis 131 (relative to the first lever 123). The second lever is pivotably connected via a third joint 133 to the retaining element 101 about a pivot axis 135 (relative to the fixed block). Furthermore the first lever 123 is pivotable about a lever pivot axis 137 of a pivot bearing 138. Here the joint axes or pivot axes 125, 131, 135, and 137 are all parallel to one another. The pivot axes 135 and 137 here fall on a line 139, which is straight and is oriented parallel to the shifting direction 111. When the tool providing system 100 is located in the waiting position only the pivot axes 135 and 137 fall on the straight line 139. However, when a tool located in the retaining element 101 is located in the work position (extended position), then all pivot axes or joint axes 125, 131, 135, and 137 fall on the straight line 139, which is parallel to the shifting direction 111.

In order to transfer the tool providing system 100 into the work position (operating mode), the piston rod 113 in FIG. 1d is moved downward until the first lever 123 and the second lever 129 are oriented parallel to the shifting direction 111. For raising and lowering the piston rod 113 the air cylinder 117 is connected at an upper end to a compressed air hose 120 and is connected at a lower end to the compressed air hose 119. Supplying compressed air to the compressed air hose 120 causes the piston rod 113 to be moved downward so that the tool held in the retaining element 101 is shifted into the work position. Supplying compressed air via the compressed air hose 119 causes the piston rod 113 to be moved upward, so that a tool held in the retaining element 101 is shifted into the waiting position. The second lever 129 includes two brackets 130, which receive an end of the first lever 123 between them, wherein the joint 127 is formed. The retaining element 101 comprises an extension piece 141, also with two brackets 143, which receive an end of the second lever 129 between them, wherein the joint 133 is formed.

The system 100 is attachable to a (movable) table by a plurality of screws 145. In the block 147 a cylinder receptacle can be provided in order to receive the cylinder 117. A bumper 149 can be provided on topside of the block 147. A fork head 151 can be provided at an upper end of the rod 113. The compressed air hoses 119, 120 can be connectable to the cylinder 117 by a quick coupling 153. The levers 123 and 129 can also be referred to as toggle levers. Sliding bushings can be provided on the joints 133, 127.

Figure 2:
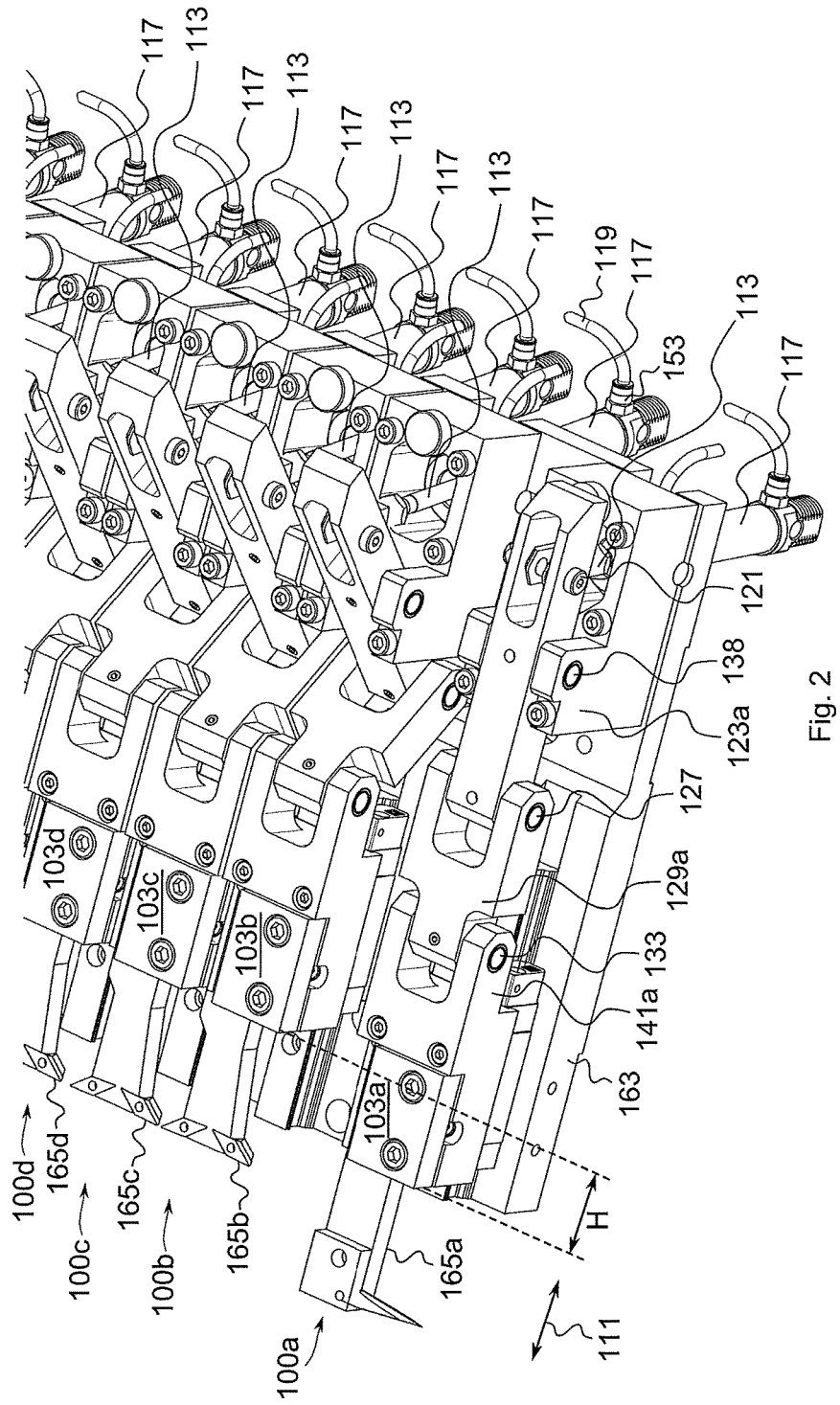
FIG. 2 is a schematic perspective depiction a device for selectively providing different tools to a lathe that includes a plurality of the tool providing systems of FIGS. 1a-1d.

FIG. 2 shows a schematic perspective depiction of a device 160 for selectively providing different tools for a lathe, which comprises a plurality of tool providing systems 100, as are illustrated in FIGS. 1a to 1d. The plurality of tool providing systems 100a, 100b, 100c, 100d, . . . are mounted adjacent to one another, i.e., offset adjacent to one another perpendicular to the shifting direction 111 on a movable table 163, in particular with screws 145. In the operating mode illustrated in FIG. 2, a tool 165a, which is held by the retaining element 101a of the tool providing system 100a in a work position, whereas all other tool providing systems 100b, 100c, 100d, . . . are located in a waiting position operating state. As illustrated in FIG. 2, in the work position a front edge of the retaining element 101a is shifted forward by a shifting distance H relative to the retaining elements 101b, 101c, and 101d along the shifting direction 111. In the work position operating mode of the tool providing system 100a all pivot axes or rotational axes 125, 137, 127, and 133 extend through the straight line 139, which is oriented parallel to the shifting direction 111.

FIGS. 3a to 3d illustrate an alternative embodiment of a tool providing system 300, which according to embodiments of the present disclosure can be used in the device 160 (see FIG. 2) for selectively providing different tools. Elements similar or identical in function and/or structure are indicated in FIGS. 1a to 1d and 3a to 3d with the same reference numbers, which only differ in the first digit. The views of the tool providing system 300, which are illustrated in FIGS. 3a to 3d, correspond to the views of the tool providing system 100, which are illustrated in FIGS. 1a to 1d. They systems 100 and 300 illustrated in FIGS. 1a to 1d and FIGS. 3a to 3d have some features in common; however they differ fundamentally in the orientation and retaining or arranging of the pressure cylinder 117 and 317. In the system 100, which is illustrated in FIGS. 1a to 1d, the air cylinder 117 is oriented almost perpendicular to the shifting direction 111. However, in the system which is illustrated in FIGS. 3a to 3d, the air cylinder 317 is disposed almost parallel to the shifting direction 311 but opposite from the shifting direction, whereby length dimension of the system 300 in the shifting direction 311 can be minimized. One end of the air cylinder 317 is connected to the guide rail or a base 310 of the guide rail 309. The tool 365 is located in a waiting position. In the work position the pivot axes 337, 331, and 335 fall on the straight line 339, which is parallel to the shifting direction 311. However, the axis of rotation of the first joint 121 does not fall on the line 339, not even in the work position. The first lever 323 has a 90° bend at the pivot axis 325.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved tool changing device.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST 100, 300 Tool providing systems
101 Retaining element
103 Clamping block
105 Clamping screws
107 Tool receiving space
109 Guide rail
111 Shifting direction
113 Piston rod
115 Longitudinal direction or shifting direction of the piston rod
117 Air cylinder
119, 120 Compressed air hoses
121 First joint
123 First lever
125 Joint axis
127 Second joint
129 Second lever
130 Bracket
131 Joint axis
133 Third joint
135 Joint axis
137 Pivot axis
139 Straight line
141 Extension piece
143 Bracket
145 Fixing screws
147 Block
149 Bumper
151 Fork head
310 Base
365 Tool
H Shifting stroke
165 Tool
100a, 100b,
100c, 100d Tool providing systems
160 Device for selective providing of different tools

What is claimed is:

1. A device for selectively applying a first tool or at least one second tool against a workpiece on a lathe, the device comprising:
    a first tool and at least one second tool providing system, each of the first tool and the at least one second tool providing systems comprising:
        a first joint;
        a first lever;
        a second joint;
        a second lever;
        a third joint;
        a tool retainer; and
        a rod mechanically connected to the tool retainer and configured to selectively shift a tool held by the tool retainer in a shifting direction from a waiting position in which the tool held by the tool retainer is spaced from the workpiece to a work position in which the tool held by the tool retainer is held against the workpiece, the first joint pivotably connecting the rod to the first lever, the second joint pivotably connecting the first lever to the second lever, and the third joint pivotably connecting the second lever to a retaining element.

2. The device according to claim 1, further including:
a pneumatic or hydraulic cylinder configured to move the rod.

3. The device according to claim 1, further including:
a guide rail fixed against movement in a direction perpendicular to the shifting direction, the retaining element being mounted for sliding movement along the guide rail.

4. The device according to claim 1, wherein the first lever is rotatable about a lever pivot axis fixed relative to the guide rail.

5. The device according to claim 1, further including
a table movable perpendicular to the shifting direction of the retaining element, on which the first and the second tool providing systems are mounted adjacent to one another.

6. The device according to claim 1, wherein the retaining element can be shifted from the work position to the waiting position in a straight line by a distance between 20 mm and 50 mm.

7. The device according to claim 1, further including:
a controller that is configured:
    to bring the first tool providing system into the waiting position;
    to move the table transverse to the shifting direction of the retaining element of the first tool providing system; and
    to bring the second tool of the second tool providing system into the work position.

8. A system comprising the device according to claim 1, the lathe, and
the workpiece on the lathe.

9. A device for selectively moving a first tool or a second tool relative to a workpiece on a lathe, the device including:
    a first and a second tool providing system, each of the first and the second tool providing systems comprising:

a guide rail having a length direction;

a slide slidably mounted on the guide rail, the slide being shiftable from a waiting position to a work position;

a tool retainer on the slide;

a block fixed relative to the guide rail;

a first lever pivotably mounted to the block for pivotal movement about a first axis of rotation, the first lever having a first joint pivotably connecting the first lever to a linear actuator and a second joint pivotably connecting a second lever;

the second lever having a first end pivotably mounted at the second joint to the first lever for pivotal movement about a second axis of rotation and a second end pivotably mounted to the tool retainer at a third joint for pivotable movement about a third axis of rotation;

the linear actuator having a rod pivotably connected to the first lever, the rod extending in a direction not parallel to the length direction of the guide rail and being shiftable from a first position to a second position, wherein shifting the rod of the first tool providing system from the first position to the second position moves slide toward the workpiece and shifting the rod of the first tool providing system from the second position to the first position moves the slide away from the workpiece.

10. The device according to claim 9, wherein the actuator is a pneumatic or hydraulic cylinder.

11. The device according to claim 9, wherein, when the slide of the first tool providing system is in the waiting position, the first axis of rotation and the third axis of rotation lie in a plane and the second axis of rotation lies outside the plane and when the slide of the first tool providing system is in the working position, the first, second and third axes of rotation lie in the plane.

12. The device according to claim 9, further including:

a table movable perpendicular to the guide rail length direction, the first and second tool providing systems being mounted on the table adjacent to one another.

13. The device according to claim 12, wherein the tool retainer is shiftable from the work position to the waiting position in a straight line by a distance of 20 mm to 50 mm.

14. The device according to claim 13, further including:

a controller configured to control the linear actuator and the table.

15. A system comprising the device according to claim 9, the device being positioned with the first tool in contact with the workpiece and the second tool spaced from the workpiece, the lathe, the workpiece on the lathe, the first tool, the second tool.

16. A device for selectively moving a first tool or a second tool relative to a workpiece on a lathe, the device including:

a first and a second tool providing system, each of the first and the second tool providing systems comprising:

a guide rail having a length direction;

a slide slidably mounted on the guide rail, the slide being shiftable from a waiting position to a work position;

a tool retainer on the slide;

a block fixed relative to the guide rail;

means for connecting the slide to the block; and means for moving the slide from the waiting position to the work position, the means for moving being operatively connected to the means for connecting, wherein the means for connecting comprises a first joint, a first lever, a second joint, a second lever, a third joint, and a tool retainer, the first joint pivotably connecting a rod to the first lever, the second joint pivotably connecting the first lever to the second lever, and the third joint pivotably connecting the second lever to a retaining element.

* * * * *